(12) United States Patent  
Tanabe et al.

(10) Patent No.: US 7,969,678 B2  
(45) Date of Patent: Jun. 28, 2011

(54) MAGNETIC DISK DRIVE HAVING ASSISTED RECORDING AND METHODS OF RECORDING DATA THERETO

(75) Inventors: Hiroyasu Tanabe, Kanagawa (JP); Hideaki Maeda, Kanagawa (JP); Hideki Zaitsu, Kanagawa (JP); Masafumi Mochizuki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 51 days.

(21) Appl. No.: 12/615,219

(22) Filed: Nov. 9, 2009

(65) Prior Publication Data

US 2010/0128376 A1 May 27, 2010

(30) Foreign Application Priority Data

Nov. 21, 2008 (JP) ................................. 2008-298847

(51) Int. Cl.  
*G11B 27/36* (2006.01)

(52) U.S. Cl. ......................................................... 360/31

(58) Field of Classification Search .................... 360/31, 360/40, 48, 46, 66, 55, 75  
See application file for complete search history.

(56) References Cited

U.S. PATENT DOCUMENTS

| | | | | |
|---|---|---|---|---|
| 4,622,599 A | * | 11/1986 | Norton, Jr. ....................... | 360/31 |
| 6,157,506 A | * | 12/2000 | Ueno ............................... | 360/45 |
| 6,199,178 B1 | * | 3/2001 | Schneider et al. .............. | 714/21 |
| 6,476,992 B1 | * | 11/2002 | Shimatani ....................... | 360/46 |
| 6,512,649 B1 | * | 1/2003 | Alini et al. ...................... | 360/68 |
| 6,594,095 B1 | * | 7/2003 | Yamagishi et al. ............. | 360/46 |
| 6,650,493 B2 | * | 11/2003 | Dakroub ......................... | 360/46 |
| 6,831,800 B2 | * | 12/2004 | Ranmuthu ...................... | 360/68 |
| 7,158,324 B2 | * | 1/2007 | Stein et al. ..................... | 360/31 |
| 7,515,371 B1 | * | 4/2009 | Buch et al. ..................... | 360/66 |
| 7,643,238 B2 | * | 1/2010 | DeGroat ......................... | 360/65 |
| 7,684,138 B2 | * | 3/2010 | Kitamura et al. .............. | 360/51 |
| 7,786,754 B2 | * | 8/2010 | Contreras et al. .............. | 326/30 |
| 2002/0049883 A1 | * | 4/2002 | Schneider et al. ............ | 711/100 |
| 2004/0109253 A1 | * | 6/2004 | Nishiyama et al. ............ | 360/46 |
| 2005/0094300 A1 | * | 5/2005 | Yano et al. ..................... | 360/31 |
| 2007/0058041 A1 | * | 3/2007 | Arseneau et al. .............. | 348/157 |
| 2008/0074772 A1 | * | 3/2008 | Yamasaki et al. .............. | 360/31 |
| 2010/0211431 A1 | * | 8/2010 | Lutnick et al. ................. | 705/10 |

FOREIGN PATENT DOCUMENTS

| | | |
|---|---|---|
| JP | 2002/133602 | 5/2002 |
| JP | 2006/272984 | 10/2008 |

* cited by examiner

*Primary Examiner* — Fred Tzeng  
(74) *Attorney, Agent, or Firm* — Zilka-Kotab, PC

(57) ABSTRACT

In one embodiment, a magnetic disk drive includes a magnetic disk, a head slider for flying above the spinning magnetic disk, a pattern analyzer for analyzing a data pattern of data to be recorded on the magnetic disk to determine a recording current reversal timing and a recording assistance area in accordance with the analysis so that the rear end of the determined recording assistance area is shifted forward if the determined recording current reversal timing is earlier than a criterion, or the rear end of the determined recording assistance area is shifted backward if the determined recording current reversal timing is later than the criterion, a recording assistance element on the slider for forming the determined recording assistance area on the magnetic disk, and a recording element for recording the data on the magnetic disk using the recording current in accordance with the determined recording current reversal timing.

20 Claims, 11 Drawing Sheets

CONTROL TABLE

| PATTERN | TIMING | POWER |
|---------|--------|-------|
| PA_0    | T_0    | PO_0  |
| PA_1    | T_1    | PO_1  |
| ⋮       | ⋮      | ⋮     |
| PA_N    | T_N    | PO_N  |

MAGNETIC DISK DRIVE HAVING ASSISTED RECORDING AND METHODS OF RECORDING DATA THERETO

RELATED APPLICATIONS

The present application claims priority to a Japanese Patent Application filed Nov. 21, 2008, under Appl. No. 2008-298847, which is incorporated herein by reference.

FIELD OF THE INVENTION

The present invention relates to a magnetic disk drive and a method of recording data to a magnetic disk, and in particular, relates to a magnetic disk drive having a function for assisting in recording data by a magnetic field from a recording element and a method of recording data to a magnetic disk using the assisted recording element.

BACKGROUND OF THE INVENTION

In storage (recording) devices used for data and information systems, semiconductor memories and magnetic memories are generally used for data storage. For applications specifying short access times, semiconductor memories are generally used in internal storage devices. For applications specifying huge capacity and non-volatility, hard disk drives (HDDs) are generally used which employ magnetic disks as external storage devices. Storage capacity is an important index to indicate the capability of magnetic disk devices. Magnetic disk devices with huge capacity and having compact size have been increasingly requested by the market with recent developments of the information age.

The volume of information processing in the information age is increasing rapidly. In particular, HDDs, which are external storage devices, have been desired to store more information in its limited area and volume. A technical approach to this desire is to increase the capacity by increasing the recording density of the HDD. To achieve higher recording density, further miniaturization of recording bits is effective. Hence, in this approach, the size of a particle which is the unit of recording in a medium has been reduced.

The further miniaturization, however, reduces the thermal stability of a recording bit which can cause evanescence of magnetic information over time by thermal fluctuations so that the non-volatility of magnetic information becomes unsatisfactory. Accordingly, to ensure thermal stability of the HDD, recording media with higher coercivity are chosen. However, it has generally been known that recording media with high coercivity are difficult to record data to. In magnetic recording, the recording magnetic field from a recording head is generally stronger than the coercivity of the medium and is changed abruptly. The production of a high recording magnetic field in a highly microscopic area is extremely difficult to obtain.

Therefore, a magnetic recording method and disk drive which can overcome these problems associated with disk drives generally used would be very desirable.

SUMMARY OF THE INVENTION

According to one embodiment, a magnetic disk drive includes a magnetic disk, a head slider for flying above the magnetic disk while the magnetic disk is spinning, a pattern analyzer for analyzing a data pattern of data to be recorded on the magnetic disk to determine a recording current reversal timing and a recording assistance area in accordance with the analysis so that the rear end of the determined recording assistance area is shifted forward if the determined recording current reversal timing is earlier than a criterion, or the rear end of the determined recording assistance area is shifted backward if the determined recording current reversal timing is later than the criterion, a recording assistance element on the slider for forming the determined recording assistance area on the magnetic disk, and a recording element for recording the data on the magnetic disk using the recording current in accordance with the determined recording current reversal timing.

According to another embodiment, a magnetic disk drive includes a magnetic disk, a head slider for flying above the magnetic disk while the magnetic disk is spinning, a control table including preset recording current reversal timings and preset recording assistance areas each corresponding to each of a plurality of patterns of a predetermined number of bits including a recording current reversal bit, a pattern analyzer for analyzing a data pattern of data to be recorded on the magnetic disk to select a recording current reversal timing and a recording assistance area corresponding to the analysis with reference to the control table, a recording assistance element on the slider for forming the determined recording assistance area on the magnetic disk, and a recording element for recording the data on the magnetic disk using the recording current in accordance with the determined recording current reversal timing.

In another embodiment, a method for recording data on a magnetic disk with a head slider flying above the magnetic disk in spinning comprises analyzing a data pattern of data to be recorded on the magnetic disk and determining a recording current reversal timing and a recording assistance area in accordance with the analysis. The method also includes recording the data on the magnetic disk in the determined recording current reversal timing and recording assistance area. The rear end of the determined recording assistance area is shifted forward from a criterion if the determined recording current reversal timing is earlier than the criterion, and the rear end of the determined recording assistance area is shifted backward from the criterion if the determined recording current reversal timing is later than the criterion.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 7 is an exemplary drawing schematically illustrating the structure of a control table to be used in control of the recording current reversal timing and the recording assistance area.

DETAILED DESCRIPTION

Figure 1:
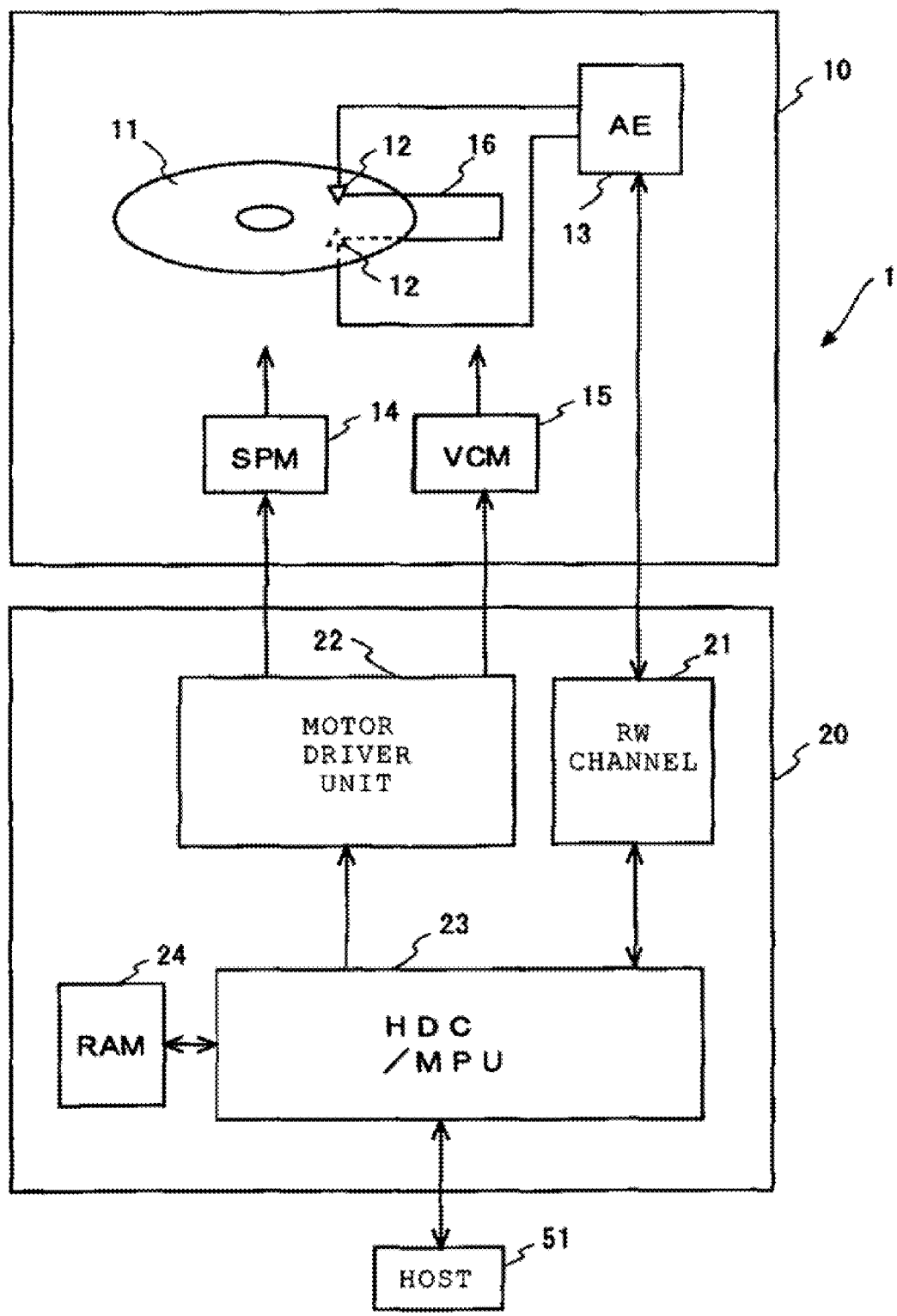
FIG. 1 is an exemplary diagram schematically depicting the structure of a magnetic disk drive according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Through the use of a phenomenon wherein heating equivalently reduces the medium coercivity, a recording scheme (heat assisted recording) has been developed which adds heat to the portion of the disk to be recorded; for example, refer to Japanese Patent Office (JPO) Pub. No. 2002-133602. Moreover, a technique is being studied that optimizes a track width in an HDD having a recording assistance element within a head slider (for example, refer to JPO Pub. No. 2006-272984).

In assisted recording, it is not sufficient only to take track width into consideration. Typically, an HDD includes a write compensation circuit in a channel circuit to cope with non-linear transition shift (NLTS). NLTS is a phenomenon where a demagnetizing field induced by the previous magnetization changes the intensity of a recording magnetic field so that a magnetic transition position on a track shifts backward or forward in the circumferential direction. As is well known in the art, in NLTS, in the in-plane recording scheme, the immediately previous or next previous magnetization (magnetization of adjacent bits) causes a magnetic transition position to shift backward compared with the magnetic transition position only by the recording magnetic field from a recording element. The back and forth direction are defined by the moving direction (flying direction) of a head slider. In contrast, in NLTS, in the perpendicular magnetic recording scheme, a magnetic transition position shifts forward compared with the magnetic transition position only by the recording magnetic field from a recording element.

To compensate for the shift of a magnetic transition position by NLTS, a HDD adjusts the timing of recording current reversal which induces magnetic transition. The HDD shifts a reversal position (timing) of recording current from the original position, forming a magnetic transition position on a recording layer at a desired position. A HDD, according to the in-plane recording scheme, delays the timing of recording current reversal on the basis of the previous magnetization, and a HDD according to the perpendicular recording scheme advances the timing of recording current reversal.

FIGS. 10(a) to 10(d) depict examples of desired magnetization and the timings of recording current reversal to accomplish such magnetization. FIG. 10(d) shows the magnetization to be accomplished. FIG. 10(a) is a timing chart where recording compensation is not performed. FIG. 10(b) is a timing chart where the reversal timing has been delayed. FIG. 10(c) is a timing chart where the reversal timing has been advanced.

Moreover, it is known that, in addition to the effect of previous magnetization, the intensity of the recording magnetic field from a recording element depends on the frequency of a recording current. The frequency of the recording current is the reversing frequency of the recording current. In general, the higher the frequency of the recording current, the lower the intensity of the magnetic field generated by a recording element. The transmission lines of recording current and a preamplifier circuit for amplifying the recording current generally have the frequency characteristics that reduce the amplitude of the recording current in a high frequency band. Accordingly, the higher the frequency of the recording current, the smaller the amplitude of the recording current supplied to the recording element, so that the intensity of the recording magnetic field degrades. On the contrary, the lower the frequency of the recording current, the larger the amplitude of the recording current supplied to the recording element, so that the intensity of the recording magnetic field increases.

The degradation in the intensity of a recording magnetic field reduces the effective magnetic field range which may induce magnetic transition on a recording layer. As a result, a track width is narrowed and a magnetic transition position shifts forward. On the contrary, an increase in the intensity of a recording magnetic field expands the effective magnetic field range which may induce magnetic transition on a recording layer. As a result, a track width is extended and a magnetic transition position shifts backward.

A shift of a magnetic transition position caused by a change in the frequency of the recording current may be compensated for by controlling the timing of reversal of the recording current, similar to the above-described NLTS caused by the previous magnetization. The recording compensation circuit compensates for shifts of the magnetic transition position caused by both of the previous magnetization and a change in the frequency of the recording current. Alternatively, control of the amplitude of the recording current so as to compensate for the frequency characteristics of the preamplifier circuit or the transmission lines leads to suppression of change of a recording magnetic field depending on the frequency of the recording current.

As described above, magnetic recording requires compensation for a shift of magnetic transition position. This is the same in the magnetic recording scheme employing assisted recording. However, controlling the reversal position (reversal timing) of the recording current supplied to a recording element in order to compensate for the shift of the magnetic transition position causes a new problem.

Figure 11:
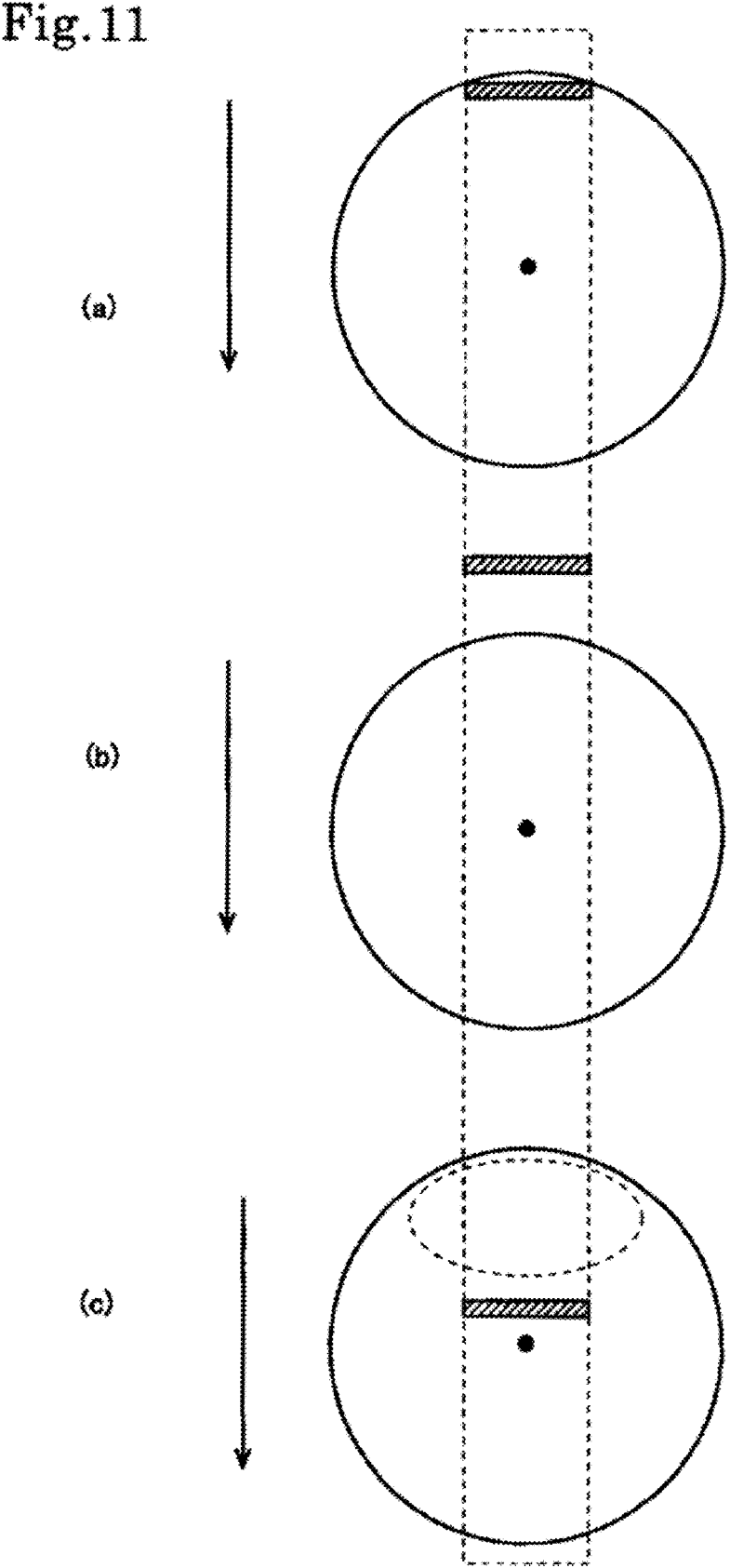
FIGS. 11(a) to 11(c) schematically illustrate a state in which a recording assistance area does not match the desired magnetic transition position in a conventional art.

FIGS. 11(a) to 11(c) schematically illustrate the relationship between a recording assistance area provided by a recording assistance element and the desired magnetic transition position, according to several embodiments. The recording magnetic field from the recording element is controlled so as to provide a desired magnetic transition position. In each of FIGS. 11(a) to 11(c), a head slider moves from the upper side to the lower side of the drawings.

FIG. 11(a) illustrates the proper positional relationship between the desired magnetic transition position and the recording assistance area, according to one embodiment. The desired magnetic transition position is indicated by the hatched rectangle. The recording assistance area is the area enclosed by the solid circle. The actual magnetic transition position is the desired Magnetic transition position and the recording assistance area is not affected by the previous magnetization.

In contrast, FIG. 11(b) illustrates the relationship between the desired magnetic transition position and the recording assistance area where the recording compensation circuit has delayed the reversal timing of the recording current, according to one embodiment. Since the reversal of the recording current has been delayed, the recording assistance area on the disk is positioned forward compared with the situation in FIG. 11(a). Hence, the desired magnetic transition position indicated by the hatched rectangle is located outside of the recording assistance area indicated by the solid circle. Since the desired magnetic transition position is outside of the recording assistance area so that recording is not available at the position, the recording magnetic field from the recording element is controlled so as to obtain a desired magnetic transition position, but the actual magnetic transition position is a different position from the desired magnetic transition position.

FIG. 11(c) illustrates the relationship between the desired magnetic transition position and the recording assistance area which may be shown in the situation where the recording compensation circuit has advanced the reversal timing of the recording current, according to one embodiment. Since the reversal of the recording current has been advanced, the recording assistance area on the disk is positioned backward compared with the situation in FIG. 11(a). Hence, the desired magnetic transition position indicated by the hatched rectangle is located closer to the center of the recording assistance area indicated by the solid circle. In such a case, a part of the recording assistance area indicated by the dashed oval overlaps with the immediately previous bit (previous magnetization), which may degrade the magnetization of the immediately previous bit. In other words, in an area which is being assisted for recording after the recording head has passed by, the quality of the recorded magnetization may be, but is not always, degraded.

Accordingly, a technique of the assisted magnetic recording is desired that forms a magnetic transition point at a desired position to assure desired quality of recording magnetization in accordance with the magnetic transition position shift phenomenon caused by previous magnetization and change of the frequency of the recording current.

According to one general embodiment, a magnetic disk drive comprises a magnetic disk, a head slider for flying above the magnetic disk while the magnetic disk is spinning, a pattern analyzer for analyzing a data pattern of data to be recorded on the magnetic disk to determine a recording current reversal timing and a recording assistance area in accordance with the analysis so that the rear end of the determined recording assistance area is shifted forward if the determined recording current reversal timing is earlier than a criterion, or the rear end of the determined recording assistance area is shifted backward if the determined recording current reversal timing is later than the criterion, a recording assistance element on the slider for forming the determined recording assistance area on the magnetic disk, and a recording element for recording the data on the magnetic disk using the recording current in accordance with the determined recording current reversal timing.

According to another general embodiment, a magnetic disk drive comprises a magnetic disk, a head slider for flying above the magnetic disk while the magnetic disk is spinning, a control table including preset recording current reversal timings and preset recording assistance areas each corresponding to each of a plurality of patterns of a predetermined number of bits including a recording current reversal bit, a pattern analyzer for analyzing a data pattern of data to be recorded on the magnetic disk to select a recording current reversal timing and a recording assistance area corresponding to the analysis with reference to the control table, a recording assistance element on the slider for forming the determined recording assistance area on the magnetic disk, and a recording element for recording the data on the magnetic disk by means of recording current in accordance with the determined recording current reversal timing.

According to yet another general embodiment, a method for recording data on a magnetic disk with a head slider flying above the magnetic disk in spinning comprises: analyzing a data pattern of data to be recorded on the magnetic disk; determining a recording current reversal timing and a recording assistance area in accordance with the analysis; and recording the data on the magnetic disk in the determined recording current reversal timing and recording assistance area. The rear end of the determined recording assistance area is shifted forward from a criterion if the determined recording current reversal timing is earlier than the criterion, and the rear end of the determined recording assistance area is shifted backward from the criterion if the determined recording current reversal timing is later than the criterion.

A magnetic disk drive according to one embodiment comprises a magnetic disk; a slider for flying above the magnetic disk in spinning; a pattern analyzer for analyzing a data pattern of data to be recorded on the magnetic disk to determine a recording current reversal timing and a recording assistance area in accordance with the analysis so that the rear end of the determined recording assistance area is shifted forward if the determined recording current reversal timing is earlier than a criterion, or the rear end of the determined recording assistance area is shifted backward if the determined recording current reversal timing is later than the criterion; a recording assistance element on the slider for forming the determined recording assistance area on the magnetic disk; and a recording element for recording the data on the magnetic disk by means of recording current in accordance with the determined recording current reversal timing. In this way, control of recording assistance area in accordance with the current reversal timing accomplishes magnetic reversal at a position appropriate for a data pattern while keeping the quality of recording magnetization.

It is preferable that the recording assistance element shift the rear end forward by shrinking or contracting the recording assistance area and shift the rear end backward by expanding the recording assistance area. Furthermore, it is preferable that the recording assistance element expand or contract the recording assistance area by changing recording assistance power to be applied to the magnetic disk. These allow adjustment of recording assistance area with simpler configuration. Preferably, the pattern analyzer determines the recording assistance area so as to expand the recording assistance area as recording current frequency increases. Thereby, change in track width may be suppressed.

It is also preferable, according to one embodiment, that the magnetic disk drive further comprise a control table including preset recording current reversal timings each corresponding to each of a plurality of different patterns of a predetermined number of bits including a recording current reversal bit and preset recording assistance areas each corresponding to each of the plurality of different patterns of a predetermined number of bits including a recording current reversal bit, and wherein the pattern analyzer selects one of the preset recording current reversal timings, and further selects one of the preset recording assistance areas in accordance with the analysis. As a result, a preferred setting is accomplished through efficient processes.

It is preferable, according to one embodiment, that the control table include pairs of the preset recording current reversal timings and the recording assistance areas each corresponding to each of the plurality of different patterns of a predetermined number of bits including a recording current reversal bit. As a result, a more preferable setting is accomplished through control in relation with both of the area and the timing.

In a preferable configuration, the recording current reversal timings and the recording assistance areas registered in the control table may be values selected on the basis of measurements of error rates. As a result, appropriate values may be selected easily. Moreover, they may be values selected based at least in part on the measurements for all possible combinations of the recording current reversal timings and the recording assistance areas. As a result, more appropriate values may be selected. The magnetic disk drive further comprises control tables each including the recording assistance areas and the recording current reversal timings corresponding to each head slider. As a result, appropriate control may be exercised for each head slider.

A disk drive, according to one embodiment, comprises a magnetic disk; a slider for flying above the magnetic disk in spinning; a control table including preset recording current reversal timings and preset recording assistance areas each corresponding to each of a plurality of patterns of a predetermined number of bits including a recording current reversal bit; a pattern analyzer for analyzing a data pattern of data to be recorded on the magnetic disk to select a recording current reversal timing and a recording assistance area corresponding to the analysis with reference to the control table; a recording assistance element on the head slider for forming the determined recording assistance area on the magnetic disk: and a recording element for recording the data on the magnetic disk using a recording current in accordance with the determined recording current reversal timing. Control of the assistance area and the current reversal timing in the same pattern analysis leads to the control with relation of the two elements, which accomplishes a preferred control.

Yet another embodiment is a method for recording data on a magnetic disk with a head slider flying above the magnetic disk in spinning. The method analyzes a data pattern of data to be recorded on the magnetic disk. It determines a recording current reversal timing and a recording assistance area in accordance with the analysis. It records the data on the magnetic disk in the determined recording current reversal timing and recording assistance area. If the determined recording current reversal timing is earlier than the criterion, the rear end of the determined recording assistance area is shifted forward from a criterion. If the determined recording current reversal timing is later than the criterion, the rear end of the determined recording assistance area is shifted backward from the criterion. In this way, control of the recording assistance area in accordance with the current reversal timing accomplishes magnetic reversal at a position appropriate for a data pattern while keeping the quality of recording magnetization.

In some embodiments, in magnetic recording using assistance of heat or electromagnetic wave, a magnetic transition position may be formed at a desired position in accordance with the magnetic transition position shift phenomenon caused by previous magnetization and change in the frequency of recording current, with the quality desired for the recording magnetization kept.

For clarity of explanation, the following descriptions and accompanying drawings may contain omissions and simplifications, if appropriate. Throughout the drawings, like components are denoted by like reference numerals, and their repetitive description is omitted if not necessary for clarity of explanation. Hereinafter, an embodiment will be described of a hard disk drive (HDD) as an example of a magnetic disk drive.

In magnetic recording to a recording layer, a HDD according to one embodiment applies energy for assisting in magnetic recording by a recording magnetic field generated from a magnetic pole to a recording area. The energy assists a recording magnetic field generated by a magnetic pole in changing the magnetizing direction. The HDD applies the energy for recording assistance in the form of heat or electromagnetic wave, or any other suitable form of energy.

Hence, a head slider implemented in the HDD of the present embodiment includes an element (recording assistance element) for applying the energy for recording assistance to the recording layer of a magnetic storage medium in addition to a magnetic pole for generating a recording magnetic field to change the magnetizing direction of the recording layer. The recording assistance element includes an element to apply light to the recording layer or an electrode pair to radiate electromagnetic wave. The present embodiment may be applied to a HDD having any type of recording assistance element.

Moreover, the HDD, according to one embodiment, controls the reversal timing of the recording current to compensate for a shift of magnetic transition position. According to a feature of the present embodiment, the HDD changes a recording assistance area together with the reversal timing of the recording current in accordance with the recording pattern. Control of the recording assistance area in accordance with the recording pattern (recording data string) accomplishes formation of a magnetic transition point at a desired position in accordance with the magnetic transition position shift phenomenon caused by previous magnetization and a change in the frequency of recording current and required quality for recording magnetization is secured.

Before explaining the control of the recording assistance area in the assisted recording according to the present embodiment with details, an entire configuration of a HDD will be described. FIG. 1 is a block diagram schematically depicting an entire configuration of a HDD, according to one embodiment. The HDD 1 comprises a magnetic disk 11, a disk for storing data inside an enclosure 10. A spindle motor (SPM) 14 spins the magnetic disk 11 at a specific angular rate. Head sliders 12 are provided to access (read or write) the magnetic disk 11; each of them corresponds to each recording surface of the magnetic disk 11. 'Access' is a broader concept comprising read and write.

Head sliders 12 are fixed at the tip of an actuator 16. The actuator 16, which is coupled to a voice coil motor (VCM) 15, pivots around a pivot shaft to move the head sliders 12 above the spinning magnetic disk 11 in its radial direction. Each head slider 12 comprises a slider for flying above the magnetic disk and a head element portion which is fixed to the slider and converts a magnetic signal to and from an electric signal. The head slider 12, according to the present embodiment, further comprises a recording assistance element to apply energy to assist in magnetic recording by a recording magnetic field from a recording element to a magnetic recording layer. The structure of the head element portion will be described later in detail with reference to FIG. 2.

On a circuit board 20 fixed outside the enclosure 10, circuit elements are mounted. A motor driver unit 22 drives the SPM 14 and the VCM 15 in accordance with control data from an HDC/MPU 23. A RAM 24 functions as a buffer for temporarily storing read data and write data. An arm electronics (AE) 13 inside the enclosure 10 selects a head slider 12 to access the magnetic disk 11 from multiple head sliders 12, amplifies a reproduction signal therefrom, and sends it to a read-write channel (RW channel) 21. Further, it sends a recording signal and a signal (including power) for the recording assistance element from the RW channel 21 to the selected head slider 12. The present embodiment may be applied to a HDD having a single head slider 12. The signal for the recording assistance element may be supplied by a circuit other than the AE 13.

The RW channel 21, in a read operation, amplifies a read signal supplied from the AE 13 to have a specific amplitude, extracts data from the obtained read signal, and decodes them. The retrieved data includes user data and servo data. The decoded read user data and servo data are supplied to the HDC/MPU 23. The RW channel 21, in a write operation, code-modulates write data supplied from the HDC/MPU 23, converts the code-modulated write data into a write signal (analog signal), and then supplies it to the AE 13. The RW channel 21 according to the present embodiment further includes a function to control the reversal timing of recording current and a function to control the recording assistance area in accordance with the recording pattern. The configuration of the RW channel 21 will be described later in detail with reference to FIG. 3.

The HDC/MPU 23, an example of a controller, performs entire control of the HDD 1 in addition to necessary processes concerning data processing, such as read/write operation control, command execution order management, positioning control of the head sliders 12 using servo signals (servo control), interface control to and from a host 51, defect management, and error handling when any error has occurred.

Figure 2:
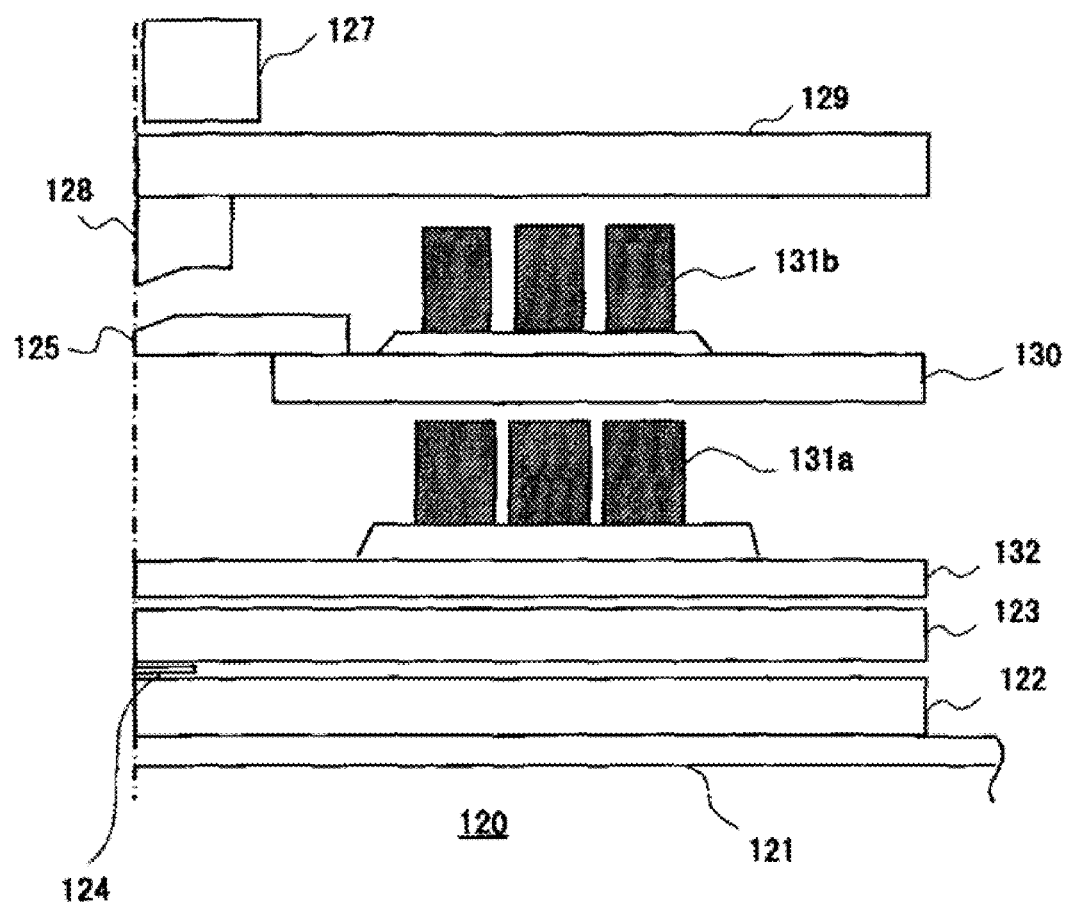
FIG. 2 is an exemplary cross-sectional view schematically depicting the head element portion in a head slider according to one embodiment.

FIG. 2 is a cross-sectional view schematically depicting a structural example of a head element portion having a recording assistance element, according to one embodiment. The head element portion applies near-field light to a recording layer as recording assistance energy. The head element portion is formed on a slider 120. A reproducing element comprises an insulting layer 121 provided on the slider 120, a lower shield 122, an upper shield 123, and an element 124 for detecting magnetic information. The recording element is formed above the reproducing element. The head element portion includes a near-field light generator element 127 which is a recording assistance element.

A soft magnetic layer 128 is disposed above a main pole 125. The soft magnetic layer 128 is magnetically connected with a soft magnetic layer 129 to form a closed magnetic path. The soft magnetic layer 129 is provided close to a lower magnetic layer 130 to be in a magnetically connected state. A lower magnetic layer 130 is magnetically connected with the main pole 130. Within the closed magnetic path formed by these layers, a coil 131b is disposed. A coil 131a is provided between a soft magnetic layer 132 and the lower magnetic layer 130.

Electric current flowing across the coil 131b causes a magnetic flux to be introduced from the soft magnetic layer 129 to the main pole 125 through the lower magnetic layer 130. The lower magnetic flux is introduced from the soft magnetic layer 132 to the main pole 125 through a recording medium. Light from a semiconductor laser on the actuator 16 or the head slider 12 is introduced to the near-field light generator element 127. The near-field light generator element 127 is an antenna type element, which applies near-field light to a minimal area by plasmon resonance. This near-field light assists in magnetic recording by a recording magnetic field generated by the main pole 125.

Figure 3:
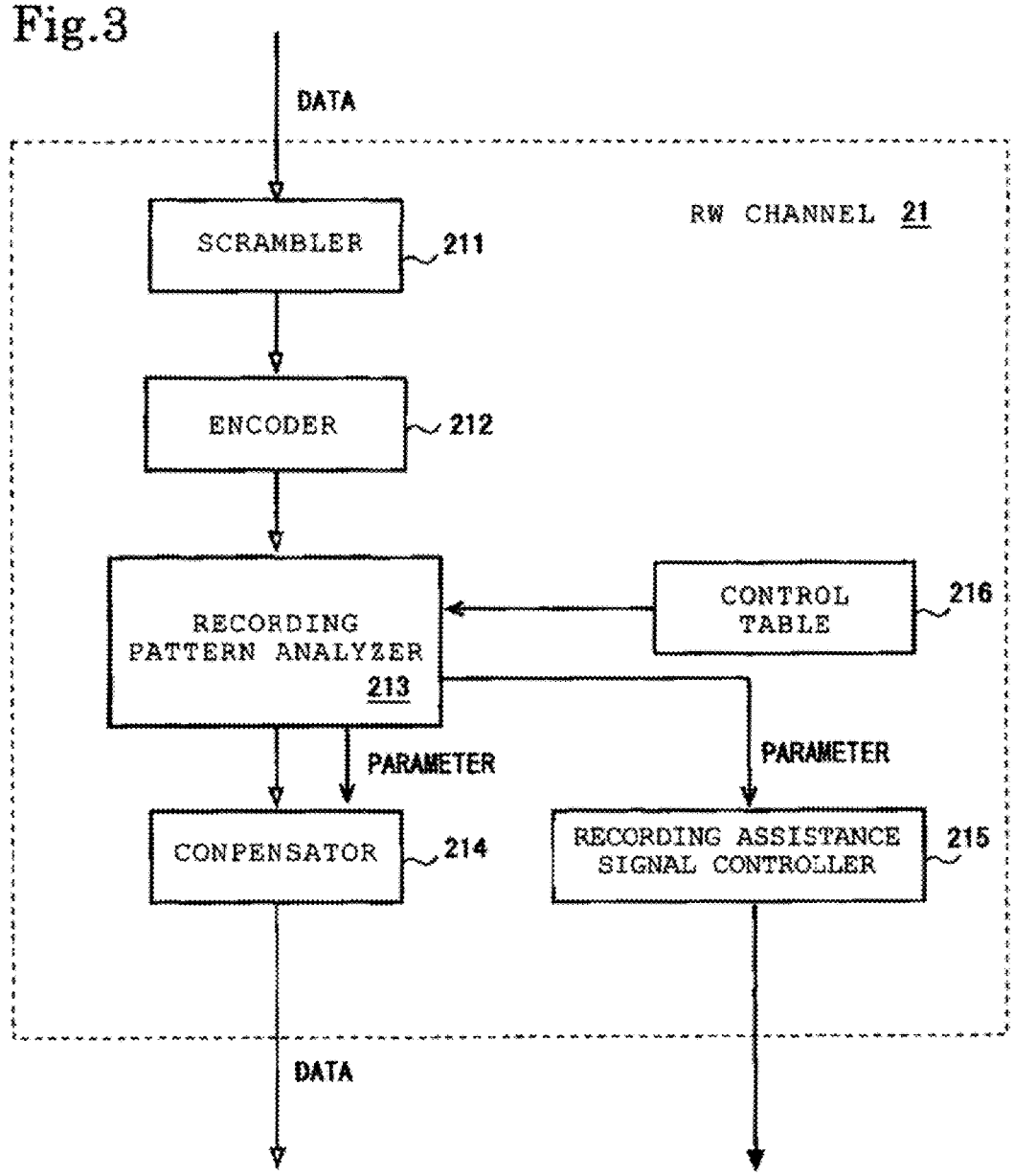
FIG. 3 is an exemplary block diagram schematically depicting the logic configuration of a recording system in an RW channel according to one embodiment.

FIG. 3 is a block diagram schematically illustrating a circuit configuration of a recording system in the RW channel 21, according to one embodiment. The RW channel 21 includes a scrambler 211, an encoder (modulator) 212, a recording pattern analyzer 213, a recording compensator 214, and a recording assistance signal controller 215. In addition, the RW channel 21 includes a volatile or non-volatile memory, in which a control table 216 is stored. Preferably, a control table 216 is prepared for each head slider 12.

User data with ECC added by the HDC/MPU 23 is transferred to the RW channel 21. The scrambler 211 randomizes the user data and transfers them to the encoder 212. The encoder 212 encodes the user data into a data string (recording pattern) so that the error rate will be small in reproducing (for example RLL encoding). The recording pattern analyzer 213 analyzes the bit pattern to be recorded and sets operation control parameters to the recording compensator 214 and the recording assistance signal controller 215 on the basis of the analysis.

The recording pattern analyzer 213 refers to the control table 216 in determining operation control parameters. The control table 216 contains operation control parameters on the basis of the analysis result. The recording compensator 214 controls the reversal timing of recording current in accordance with the set parameter. The recording assistance signal controller 215 controls a signal to the recording assistance element in a head slider 12 in accordance with the set parameter.

Figure 10:
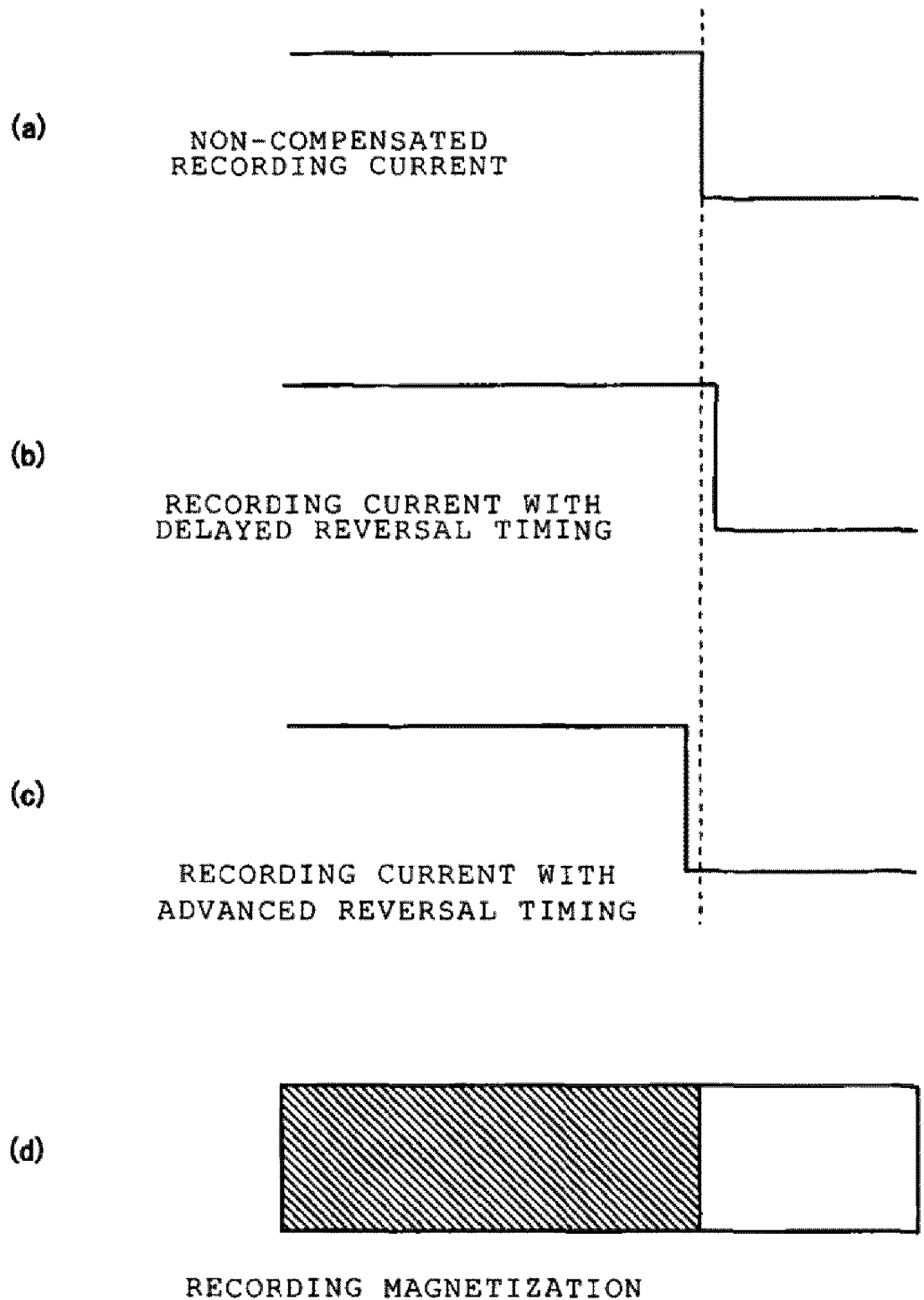
FIGS. 10(a) to 10(d) are exemplary diagrams schematically illustrating the control method of recording current reversal timing in accordance with the previous magnetization and the frequency of the recording current in a conventional art.

The recording compensator 214 reverses recording current with reference timing, advanced timing earlier than the reference timing, or delayed timing later than the reference timing in accordance with the recording pattern (refer to the description for FIG. 10). The recording pattern analyzer 213 sets a shift value from the reference timing (including the sign indicating before or after the reference timing) to the recording compensator 214. The recording compensator 214 shifts (advances or delays) the reversal timing of the recording current by the set shift value.

The recording assistance signal controller 215 controls the recording assistance area by the recording assistance element on the head slider in accordance with instructions from the recording pattern analyzer 213. The recording assistance area is an area where energy stronger than preset reference intensity is applied, and within the area, energy strong enough for assisting in recording magnetic reversal is applied. In the recording assistance area, the intensity of the magnetic field from the recording element required for magnetic reversal is small. When a recording magnetic field (magnetic field stronger than the preset value) from the recording element overlaps with the recording assistance area, the magnetization of the magnetic recording layer is reversed.

In a preferred example, the recording assistance signal controller 215 controls the power of the energy applied from the recording assistance element to the recording layer to control the recording assistance area. As the power increases or decreases, the recording assistance area expands or shrinks. In general, the control of the power to be supplied to the recording assistance element leads to control of the power from the recording assistance element to the recording layer.

The recording assistance area is controlled by a method appropriate for the characteristics of a recording assistance element. For example, if functionally possible for the recording assistance element, the recording assistance area may be moved without changing its shape, or may be expanded or shrunk without changing the energy power to be applied to the recording layer. Hereinafter, by way of a preferred example, a technique will be described that changes the power from the recording assistance element to the magnetic recording layer to change the size of the recording assistance area.

Figure 4:
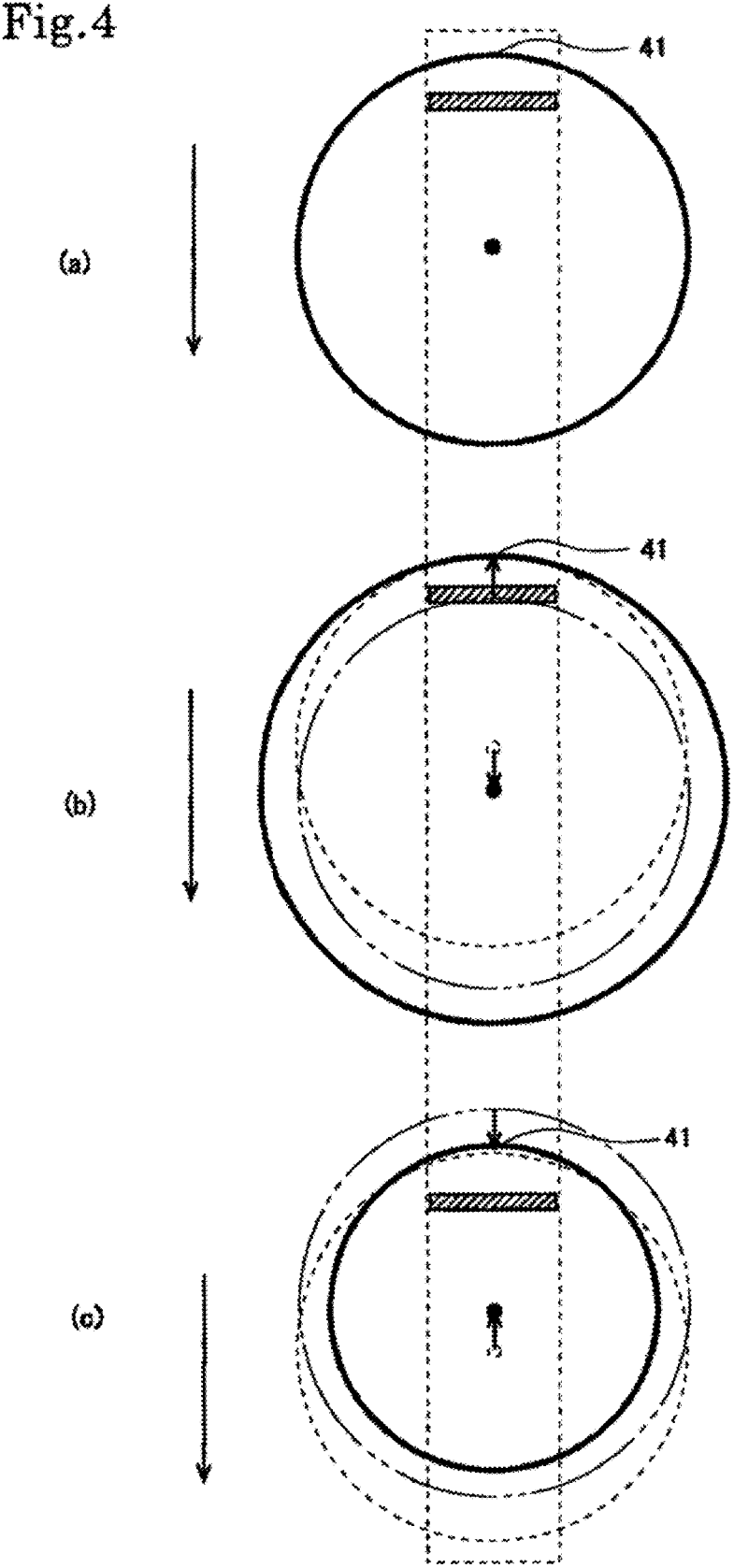
FIGS. 4(a) to 4(c) are exemplary conceptual views schematically illustrating the relationship between the magnetic transition position of a recording layer, the recording current reversal timing adjusted by a recoding compensator, and the recording assistance area adjusted by a recoding assistance signal controller, in one embodiment.

The relationship among individually changing recording current reversal timing and recording assistance area, and the magnetic transition point determined thereby will be explained. FIGS. 4(*a*) to 4(*c*) are conceptual diagrams schematically illustrating the relationship among the magnetic transition position on the recording layer, the recording current reversal timing adjusted by the recording compensator 214, and the recording assistance area adjusted by the recording assistance signal controller 215. The recording assistance areas are the areas enclosed by solid circles. The magnetic transition positions (magnetic transition points) are indicated by hatched rectangles. In all of the examples, the magnetic transition points are formed at desired specific positions. In FIGS. 4(*b*) and 4(*c*), the recording assistance area in FIG. 4(*a*) is indicated by dashed circles.

FIG. 4(*a*) illustrates a magnetic transition position and a recording assistance area in the case that the recording compensator 214 reverses magnetic recording current with usual reference timing. It further shows the center of the recording assistance area. A head slider 12 moves from the upper side of the drawing toward the lower side thereof in data recording. The backward and the forward are defined relative to the moving direction of the head slider 12. Namely, the upper side of the drawing is backward and the lower side of the drawing is forward. FIG. 4(*b*) illustrates a magnetic transition position where the magnetic recording current is reversed with timing delayed from the reference timing and the recording assistance area corresponding to the delayed recording current reversal timing. FIG. 4(*c*) illustrates a magnetic transition position where the magnetic recording current is reversed with timing advanced from the reference timing and the recording assistance area corresponding to the advanced recording current reversal timing. The shape of the recording assistance area may vary depending on the recording assistance element.

In FIG. 4(*b*), the solid circle indicates the actual recording assistance area. The dashed circle indicates the reference recording assistance area in accordance with the reference timing (FIG. 4(*a*)). The two-dot chain circle indicates a virtual recording assistance area assuming that the recording assistance area having the same size as the one formed with the reference timing is formed with the delayed timing (position).

As shown in FIG. 4(*b*), if magnetic recording current reversal timing is later than the reference timing, the center of the recording assistance area is shifted forward. Besides, a recording assistance area having a larger spot diameter (larger dimensions) is formed on the recording surface. Namely, greater power is applied to the recording layer. Thereby, the position of the back end 41 of the recording assistance area (solid circle) is shifted backward from the recording assistance area (two-dot chain circle) which is assumed to be formed with the same timing (position) and in the reference size.

In FIG. 4(*c*), the solid circle indicates the actual recording assistance area. The dashed circle indicates the reference recording assistance area in accordance with the reference timing (FIG. 4(*a*)). The two-dot chain circle indicates a virtual recording assistance area assuming that a recording assistance area having the same size as the one formed with the reference timing is formed with the advanced timing (position). As shown in FIG. 4(*c*), if the recording compensator 214 reverses magnetic recording current with advanced timing from the reference timing, the center of the recording assistance area is shifted backward. Besides, a recording assistance area having a smaller spot diameter (smaller dimensions) is formed on the recording surface. Namely, smaller power is applied to the recording layer. Thereby, the position of the back end 41 of the recording assistance area (solid circle) is shifted forward from the recording assistance area (two-dot chain circle) which is assumed to be formed with the same timing (position) and in the reference size.

In this way, changing the recording assistance area depending on the reversal timing of the magnetic recording current allows a magnetic transition point to be formed at a desired position on tracks. As shown in FIGS. 4(*b*) and 4(*c*), since the overlapping areas of the recording assistance area and the previous magnetization (bit) substantially do not change or substantially no overlapping areas exist, the degradation of the previous magnetization by the energy for the recording assistance may be prevented.

Figure 5:
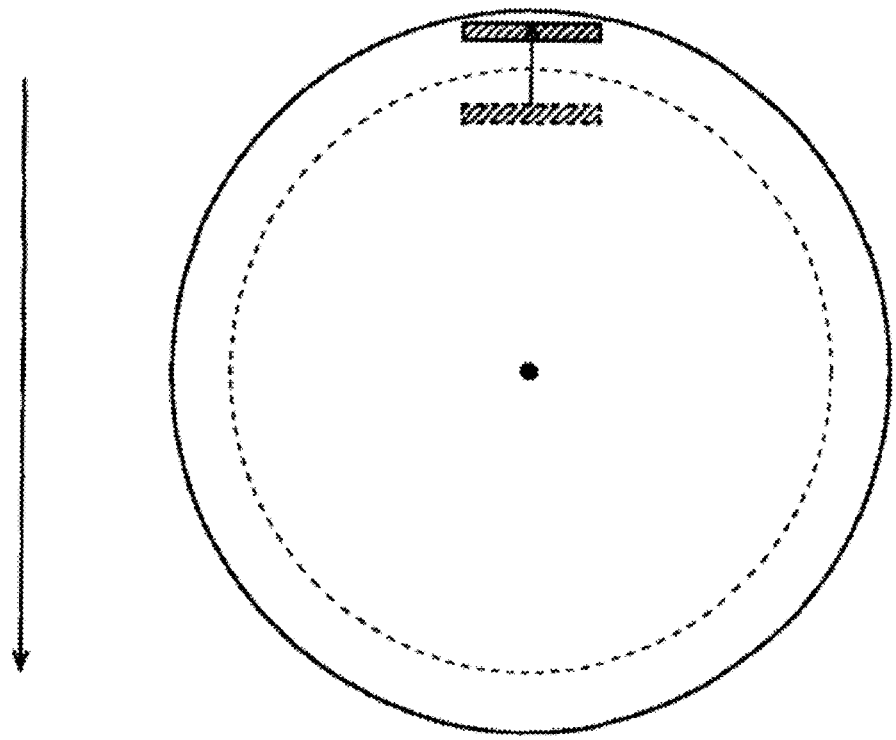
FIGS. 5(a) to 5(b) are exemplary conceptual views schematically illustrating the relationship between changing recording assistance area and magnetic transition position with the same recording current reversal timing in one embodiment.
Figure 5:
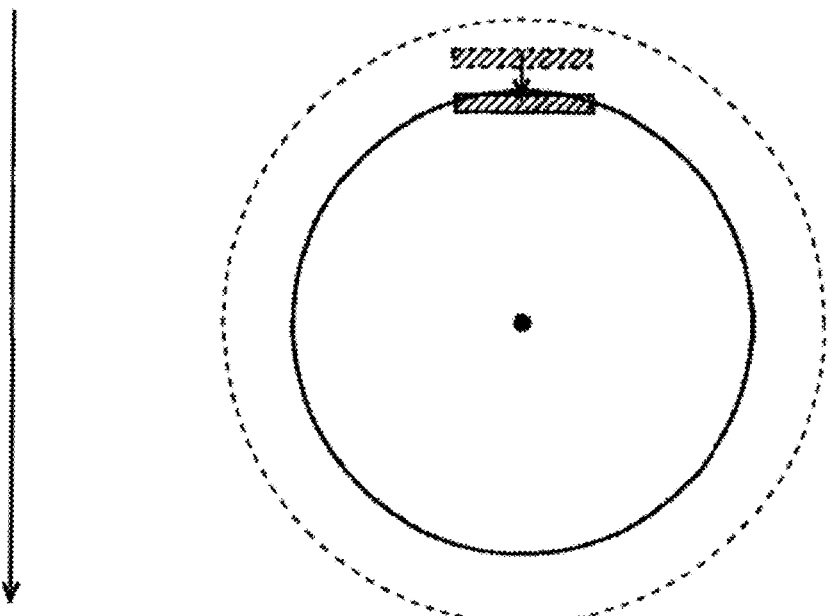

Next, the relationship between the changing recording assistance area and magnetic transition position with the same recording current reversal timing will be conceptually explained. FIGS. 5(*a*) and 5(*b*) are conceptual drawings each schematically illustrating the relationship between the magnetic transition position of the recording layer (hatched rectangle) and the recording assistance area adjusted by the recording assistance signal controller 215 (solid circle). The timings of recording current reversal are assumed to be the same. The symbols in the drawings have the same meanings as those in FIG. 4.

The magnetic transition position is formed at the position where the sum of the energy from the recording assistance element and the magnetic energy from the recording element exceeds a threshold. As shown in the conceptual drawing of FIG. 5(*a*), if the recording assistance area is expanded, the magnetic transition position may be shifted backward. On the other hand, as shown in the conceptual drawing of FIG. 5(*b*), if the recording assistance area is contracted, the magnetic transition position may be shifted forward.

The HDD 1 according to the present embodiment forms a magnetic transition point at a desired position using recording current reversal timing control by the recording compensator 214 and recording assistance area control by the recording assistance signal controller 215 in combination. The control methods include an approach that adjusts the magnetic transition position using the recording current reversal timing and adjusts the recording assistance area so as to conform to the recording current reversal timing, and another approach that adjusts the magnetic transition position using both of the recording current reversal timing and the recording assistance area.

In the former approach, if the recording current frequency increases (decreases), a recording assistance area tends to contract (or expand). As described above, the increase in recording current frequency leads to decrease in intensity of the magnetic field from the recording element so that the magnetic transition point shifts forward. To compensate for the shift, the recording compensator 214 advances the recording current reversal timing. This is the case explained with reference to FIG. 4(c), where the recording assistance signal controller 215 contracts the recording assistance area. Since the magnetic transition position is affected by the previous magnetization and recording current frequency, the shift direction of the magnetic transition point is not determined only by recording current frequency.

Figure 6:
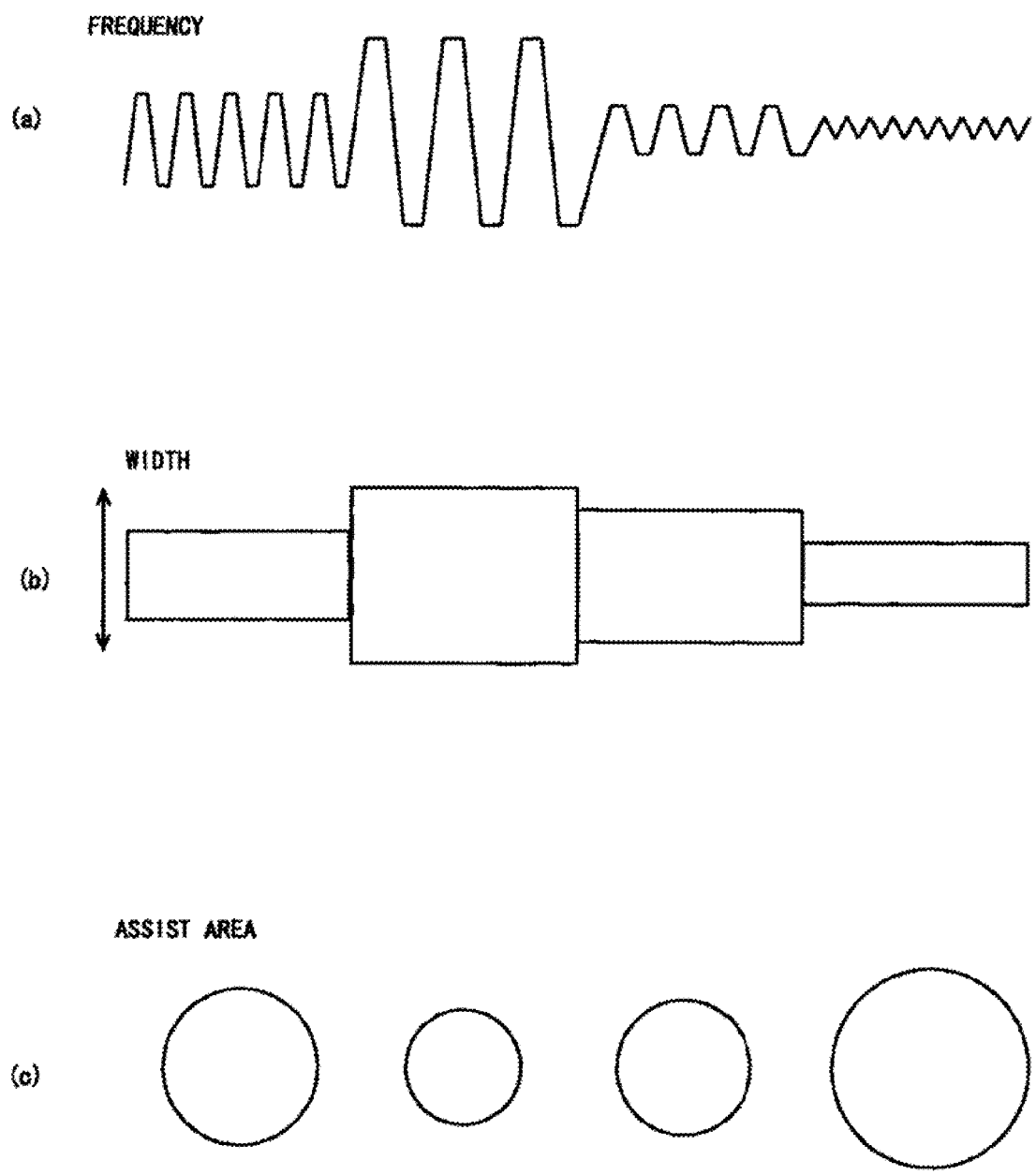
FIGS. 6(a) to 6(c) are exemplary conceptual views schematically illustrating the relationship between frequency of recording current, recording track (track width), and recording assistance area in one embodiment.

When considering the relationship between the recording current frequency and the recording assistance area, it is important to consider recording width (write width) in addition to the magnetic transition point. FIGS. 6(a) and 6(b) are conceptual drawings schematically illustrating the relationship between the recording current frequency and the recording width (track width), according to one embodiment. FIG. 6(a) schematically illustrates the recording current frequency; FIG. 6(b) illustrates the recording width. As illustrated, increase in the recording current frequency leads to decrease in recording width (track width) and reduction in recording current frequency leads to increase in recording width (track width).

On the other hand, the expansion of a recording assistance area may increase recording width. The recording width is determined by the overlap of a recording assistance area and a magnetic field from the recording element. Accordingly, to suppress the change in recording width caused by change in recording current frequency, it is preferable to expand (contract) the recording assistance area with increase (decrease) in recording current frequency as schematically illustrated in FIG. 6(c).

As explained with reference to FIGS. 5(a) and 5(b), the expansion and the contraction (shrinkage) of the recording assistance area allows the magnetic transition position to shift back and forth. Increase in the recording current frequency causes the magnetic transition position to shift forward. Accordingly, the expansion (or contraction) of the recording assistance area with the increase (decrease) in recording current frequency accomplishes compensation for the change of the magnetic transition position caused by the recording current frequency using the recording assistance area.

Then, according to one approach, compensation for a shift of the magnetic transition position caused by a change in the recording current frequency mainly by using the recording assistance area and compensation for a shift of the magnetic transition position caused by the previous magnetization mainly by using the recording current timing. The recording assistance signal controller 215 may change the recording assistance area in accordance with change of the recording current timing, but at least if the recording current timing is constant, it increases or decreases recording current frequency to expand or contract the recording assistance area.

Next, one preferred example of the operation of the recording pattern analyzer 213 will be described. The recording pattern analyzer 213 analyzes a recording data string and determines the operational parameters for the recording compensator 214 and the recording assistance controller 215 in accordance with the analysis result and data in the control table 216. The recording compensator 214 and the recording assistance controller 215 perform processes in accordance with the operational parameters set by the recording pattern analyzer 213.

The operational parameters set by the recording pattern analyzer 213 individually determine the recording current reversal timing and the recording assistance area, according to one embodiment. Specifically, they are the power for determining the shift amount (including the shift direction) from the reference timing for the recording current reversal and the power for determining the recording assistance area. In the present example, the power supplied from the recording assistance controller 215 determines the supply energy of the recording assistance element.

Figure 8:
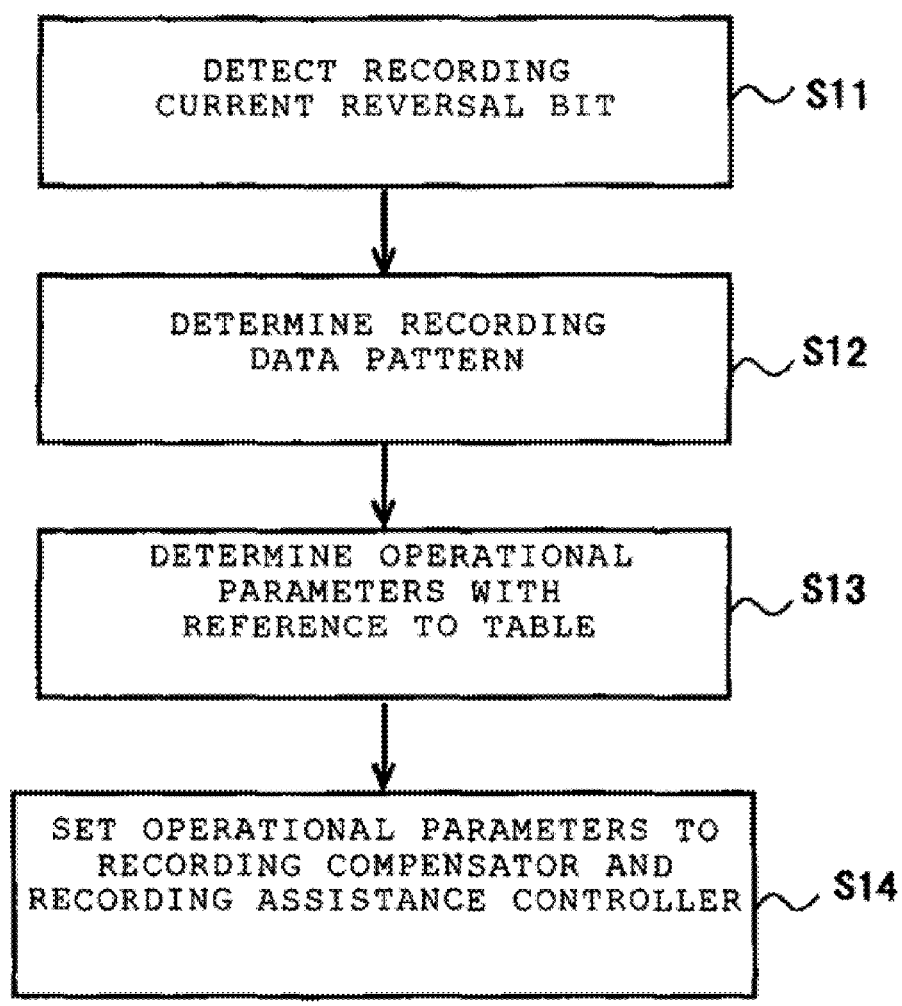
FIG. 8 is an exemplary flowchart illustrating the process of a recording pattern analyzer, according to one embodiment.

As shown in FIG. 7, the control table 216 includes the timing and the power associated with the recording data pattern, according to one embodiment. The timing indicates the shift amount for the recording current reversal timing and the power indicates the power the recording assistance controller 215 supplies. The recording data pattern is a data pattern (data string) having a predetermined number of bits. For example, a 5-bit data string has 32 patterns and the number of entry patterns in the control table 216 is less than 32. The number of entry patterns changes depending on the bit length of recording patterns which are subjected to the analysis. Typically, the control table 216 includes all patterns for the predetermined number of bits including a recording current reversal bit but may incorporate some different patterns into an entry:

As illustrated in the flowchart of FIG. 8, the recording pattern analyzer 213 analyzes the pattern of the encoded recording data to be recorded to the magnetic disk 11 and detects a bit to cause recording current reversal (recording current reversal bit) (S12). Further, the recording pattern analyzer 213 determines a data pattern which includes the recording current reversal bit and has a specified bit length in the recording data string (S12). The recording pattern analyzer 213 extracts the data pattern so that the recording current reversal bit will be positioned at the specified bit position in the data pattern. The specified bit position is, for example, the last bit in the data pattern or the middle bit therein.

Subsequently, the recording pattern analyzer 213 selects the entry which matches the extracted data pattern and identifies the timing and the power associated with the entry referring to the control table 216 (S13). The recording pattern analyzer 213 sets the timing and the power registered in the control table 216 corresponding to the extracted pattern to the recording compensator 214 and the recording assistance controller 215, respectively (S14). The recording compensator 214 shifts the recording current reversal timing in accordance with the set parameter, and the recording assistance controller 215 supplies the power in accordance with the set parameter to the recording assistance element.

Preferably, as shown in FIG. 7, the entries for the pattern to determine the recording current reversal timing and the recording assistance area (each element in the row of a pattern in FIG. 7) are the same. In other words, like the example in FIG. 7, it is preferable that the both parameters for determining the recording current reversal timing and the recording assistance area be registered to each registered pattern contained in the control table 216. This increases the correlativity between the two parameters to achieve more appropriate control. Depending on the design, however, the two parameters may be determined individually. For example, data patterns to be used may be different in bit length or different in recording current reversal bit position therein.

To obtain desired magnetization on the magnetic recording layer, it is important to determine operational parameters appropriate for the recording data pattern, namely, the recording current reversal timing (shift amount) and the recording assistance area (power). Hereinafter, a preferable determination method of operational parameters each corresponding to each of the recording data patterns registered in the control table 216 as entries will be described.

In a preferred example, the HDD 1 registers the operational parameters in the control table 216 in the test step in manufacture thereof. The criterion to determine proper values for the operational parameters is preferably the quality of the recorded data (magnetized condition). One of the values indicating data quality is error rate. The RW channel 21 obtains the analog signal read by a head slider 12 from the AE 13 to perform AD conversion, and then performs waveform equalization and decoding (Viterbi decoding). The RW channel 21 further demodulates the decoded data to transfer them to the HDC/MPU 23.

The HDC/MPU 23 includes an error correction circuit, according to one embodiment; it performs an error correction using an error correction code (ECC), which is redundant data attached to the data transferred from the RW channel 21. The error rate is determined on the basis of the errors corrected in this error correction process. The HDD 1 performs recording of data having a specific pattern with different operational parameters, and then reproduces the recorded data to measure the error rate.

For example, the HDC/MPU 23 preliminarily stores a data pattern to record in the RAM 24, and compares the data transferred from the RW channel 21 with the stored data to calculate the error rate. The HDD 1 selects operational parameters appropriate for each recording pattern in accordance with the measurement result.

Figure 9:
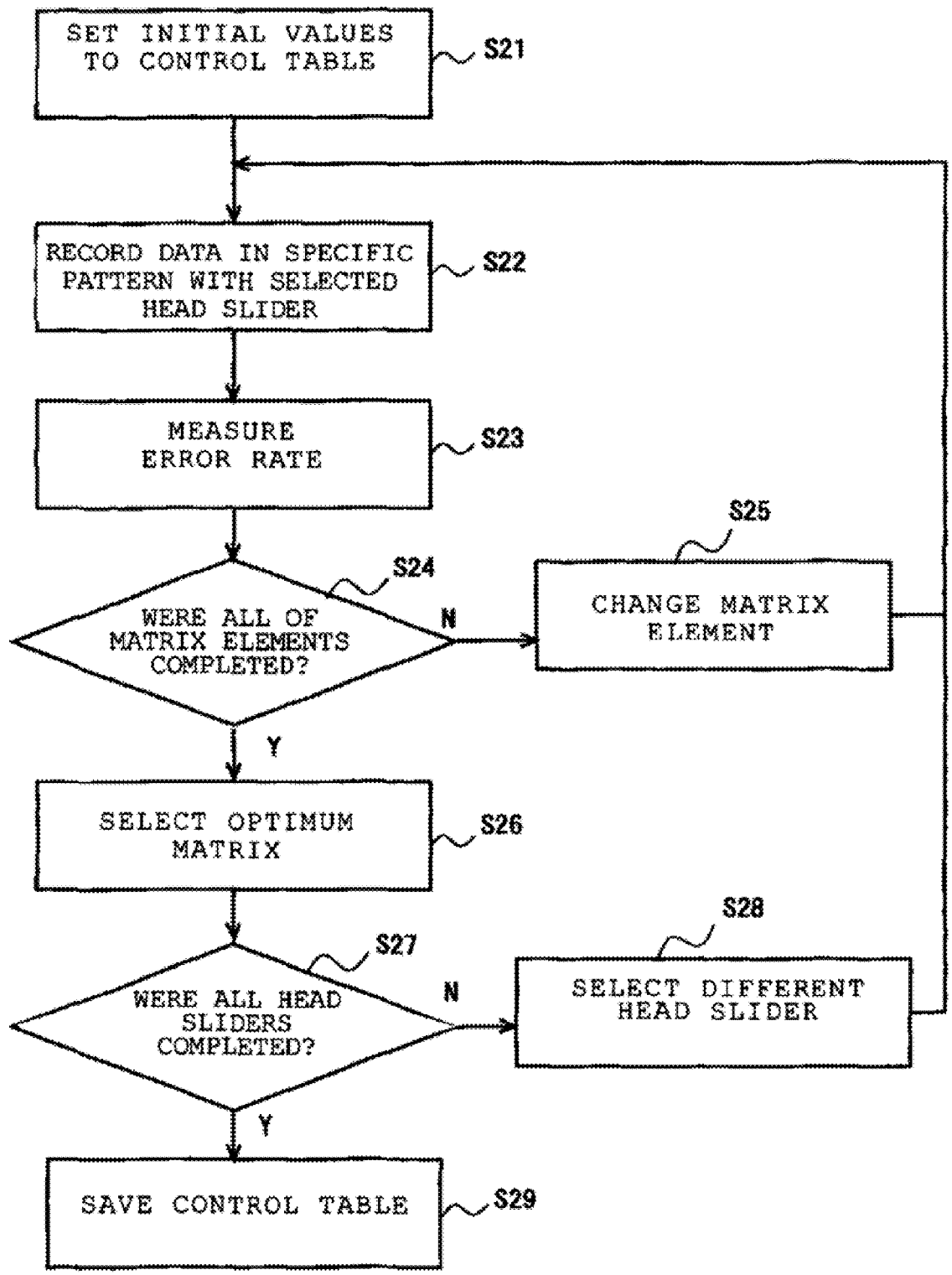
FIG. 9 is an exemplary flowchart illustrating the determination of operational parameters registered in the control table in one embodiment.

Now, with reference to the flowchart of FIG. 9, the determination of operational parameters will be described. The HDC/MPU 23 registers the initial values to control tables 216 each corresponding to a head slider 12 (S21). The RW channel 21 stores the control tables 216 containing the registered initial values to a memory. Next, the HDC/MPU 23 selects a head slider 12 and records data having a specific pattern with a specific timing and at a specific power (S22). The recording pattern may be changed in accordance with the patterns registered in a control table 216 as entries. Then, the HDC/MPU 23 retrieves the recorded data with the selected head slider 12 to measure the error rate of the reproduced data, and stores it to the RAM 24 (S23).

If measurement for all possible combinations (matrix) of the patterns, the timing, and the power in the control table 216 has not been completed (N in S24), the HDC/MPU 23 changes anyone of the three elements for the selected head slider 12 (S25) and repeats the processes of the steps S22 and S23 with other different matrix elements (of a matrix composed of a combination of the pattern entry, the timing and the power).

After the HDC/MPU 23 has completed measurements of the error rates for all matrix elements (combinations) of the timing and the power (Y in S24), it selects the optimum combination of the timing and the power for each entry pattern from the measurement results stored in the RAM 24 (S26). Specifically, it selects the combination (matrix element) with the smallest error rate.

After the registration of a control table 216 for a head slider 12 is completed but the registration of the control tables for all of the head sliders 12 has not been completed (N in S27), the HDC/MPU 23 selects another head slider (S28) and repeats the above processes (S22 to S26). When the setting of the control table for all of the head sliders has been completed (Y in S26), the HDC/MPU 23 saves the control tables to a non-volatile memory area, such as the management area of the magnetic disk 11 or a non-volatile semiconductor memory (S29). The RW channel 21 performs data recording referring to the saved control tables 216.

In the above explanation, the registration of the control tables through measurement is executed by the HDC/MPU 23, which is the controller of the HDD 1. In the test step of the HDD 1, however, an external test device (external computer) may execute these processes. Instead of the test step, the HDC/MPU 23 may update the control tables 216 at a start-up of the HDD 1. To avoid any delay at the start-up, the HDC/MPU 23 performs measurement and update for preferably a part of the head sliders 12.

The above-described control table registration performs measurements for all of the operational parameter matrices (all combinations of the timing and the power for all of the entry patterns) to select the optimum matrix from the measurement results. Since the recording current reversal timing and the recording assistance area affect each other, more appropriate operational parameters may be selected. This registration accomplishes the recording assistance area conforming to a shift of the recording current reversal timing and a recording current frequency as explained with reference to FIGS. 4 and 6.

Otherwise, one of the operational parameters may be first registered and the other operational parameter may be registered thereafter. For example, the HDC/MPU 23 performs data recordings with different recording current reversal timings (timings) with a uniform recording assistance area (power) and determines the proper timing in accordance with the error rates. Then, the HDC/MPU 23 performs data recordings at varied power to measure the error rates with the determined proper timing to determine the proper power.

Such registration corresponds to control using the control with one of the operational parameters as the main process and the control with the other operational parameter as a sub process. For example, it uses the function of the recording compensator 214 as the main compensation function and the function of the recording assistance area controller 215 as a sub compensation function. Such registration may reduce the process time required for the registration of the control table. Otherwise, the HDD 1 may determine the proper recording current reversal timing by other methods and then determine the proper recording assistance area for the proper timing through error rate measurement.

As set forth above, several embodiments have been described by way of example, but the invention is not limited to the above described embodiments and examples. A person skilled in the art may easily modify, add, convert, or otherwise change the components in the above embodiments within the scope of the present invention. For example, the present invention may be applied to a magnetic disk drive employing assisted recording according to any technique. The control of recording current reversal timing and recording assistance area in accordance with the recording bit patterns may be exercised by any functional block in the HDD. In the above description, the RW channel includes the function, but the HDC/MPU 23 may control them. Alternatively, the RW channel may include intelligence functions to execute the registration of the control table.

It should be noted that methodology presented herein for at least some of the various embodiments may be implemented, in whole or in part, in computer hardware, software, by hand, using specialty equipment, etc., and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic disk drive, comprising:
   a magnetic disk;
   a head slider for flying above the magnetic disk while the magnetic disk is spinning;
   a pattern analyzer for analyzing a data pattern of data to be recorded on the magnetic disk to determine a recording current reversal timing and a recording assistance area in accordance with the analysis so that the rear end of the determined recording assistance area is shifted forward if the determined recording current reversal timing is earlier than a criterion, or the rear end of the determined recording assistance area is shifted backward if the determined recording current reversal timing is later than the criterion;
   a recording assistance element on the slider for forming the determined recording assistance area on the magnetic disk; and
   a recording element for recording the data on the magnetic disk using the recording current in accordance with the determined recording current reversal timing.

2. The magnetic disk drive according to claim 1, wherein the recording assistance element shifts the rear end forward by shrinking the recording assistance area and shifts the rear end backward by expanding the recording assistance area.

3. The magnetic disk drive according to claim 2, wherein the recording assistance element expands or shrinks the recording assistance area by changing recording assistance power applied to the magnetic disk.

4. The magnetic disk drive according to claim 2, wherein the pattern analyzer determines the recording assistance area such that the recording assistance area is expanded as a recording current frequency increases.

5. The magnetic disk drive according to claim 1, further comprising:
   a control table including preset recording current reversal timings each corresponding to each of a plurality of different patterns of a predetermined number of bits including a recording current reversal bit and preset recording assistance areas each corresponding to each of the plurality of different patterns of a predetermined number of bits including a recording current reversal bit,
   wherein the pattern analyzer selects one of the preset recording current reversal timings, and
   wherein the pattern analyzer further selects one of the preset recording assistance areas in accordance with the analysis.

6. The magnetic disk drive according to claim 5, wherein the control table includes pairs of the preset recording current reversal timings and the recording assistance areas each corresponding to each of the plurality of different patterns of a predetermined number of bits including a recording current reversal bit.

7. The magnetic disk drive according to claim 5, wherein the recording current reversal timings and the recording assistance areas registered in the control table are values selected at least in part based on measurements of error rates.

8. The magnetic disk drive according to claim 7, wherein the recording current reversal timings and the recording assistance areas registered in the control table are values selected at least in part based on measurements for all possible combinations of the recording current reversal timings and the recording assistance areas.

9. The magnetic disk drive according to claim 5, further comprising control tables each including the recording assistance areas and the recording current reversal timings corresponding to each head slider.

10. A magnetic disk drive, comprising:
    a magnetic disk;
    a head slider for flying above the magnetic disk while the magnetic disk is spinning;
    a control table including preset recording current reversal timings and preset recording assistance areas each corresponding to each of a plurality of patterns of a predetermined number of bits including a recording current reversal bit;
    a pattern analyzer for analyzing a data pattern of data to be recorded on the magnetic disk to select a recording current reversal timing and a recording assistance area corresponding to the analysis with reference to the control table;
    a recording assistance element on the slider for forming the determined recording assistance area on the magnetic disk; and
    a recording element for recording the data on the magnetic disk using the recording current in accordance with the determined recording current reversal timing.

11. The magnetic disk drive according to claim 10, wherein the recording assistance element shrinks and expands the recording assistance area.

12. The magnetic disk drive according to claim 11, wherein the pattern analyzer determines the recording assistance area such that the recording assistance area is expanded as a recording current frequency increases.

13. The magnetic disk drive according to claim 10, wherein the recording current reversal timings and the recording assistance areas registered in the control table are values selected at least in part based on measurement of error rates.

14. The magnetic disk drive according to claim 13, wherein the recording current reversal timings and the recording assistance areas registered in the control table are values selected at least in part based on measurement of all possible combinations of the recording current reversal timings and the recording assistance areas.

15. The magnetic disk drive according to claim 10, further comprising control tables each including the recording assistance area and the recording current reversal timing corresponding to each head slider.

16. A method for recording data on a magnetic disk with a head slider flying above the magnetic disk in spinning, the method comprising:
    analyzing a data pattern of data to be recorded on the magnetic disk;
    determining a recording current reversal timing and a recording assistance area in accordance with the analysis; and
    recording the data on the magnetic disk in the determined recording current reversal timing and recording assistance area,
    wherein the rear end of the determined recording assistance area is shifted forward from a criterion if the determined recording current reversal timing is earlier than the criterion, and
    wherein the rear end of the determined recording assistance area is shifted backward from the criterion if the determined recording current reversal timing is later than the criterion.

17. The method according to claim 16, wherein the rear end is shifted forward by contracting the recording assistance area and the rear end is shifted backward by expanding the recording assistance area.

18. The method according to claim 17, wherein the recording assistance area is determined so as to be expanded as recording current frequency increases.

19. The method according to claim 16, further comprising selecting one of the preset recording current reversal timings and further selecting one of the preset recording assistance areas in accordance with the analysis, wherein the recording current reversal timing is preset corresponding to each of a plurality of different patterns of predetermined number of bits including a recording current reversal bit, and wherein the recording assistance area is preset corresponding to each of the plurality of different patterns of predetermined number of bits including a recording current reversal bit.

20. The method according to claim 19, wherein the registered current reversal timings and the recording assistance areas are values selected on the basis of measurements of error rates.

* * * * *